(12) United States Patent
Hua et al.

(10) Patent No.: US 11,531,500 B1
(45) Date of Patent: Dec. 20, 2022

(54) COALESCING STORAGE SPACE OF HETEROGENEOUS NODES FOR FLEXIBLE EXPANSION

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 17/512,726

(22) Filed: Oct. 28, 2021

(51) Int. Cl.
    *G06F 3/06* (2006.01)
(52) U.S. Cl.
    CPC ............ *G06F 3/067* (2013.01); *G06F 3/0604* (2013.01); *G06F 3/0644* (2013.01)
(58) Field of Classification Search
    CPC .... G06F 3/0647; G06F 3/0604; G06F 3/0644; G06F 3/067
    See application file for complete search history.

(56) References Cited

U.S. PATENT DOCUMENTS

| 7,721,044 | B1* | 5/2010 | Chatterjee ............. | G06F 3/0607 |
| | | | | 714/E11.088 |
| 2019/0294339 | A1* | 9/2019 | Bolkhovitin .......... | G06F 3/0607 |

* cited by examiner

*Primary Examiner* — Chie Yew
(74) *Attorney, Agent, or Firm* — Anderson Gorecki LLP (57) ABSTRACT

A storage system has a plurality of heterogenous storage nodes characterized by non-uniform total non-volatile storage capacity. Storage capacity of all nodes is configured as same-size cells and represented as a set of matrices. The matrices have dimensions corresponding to consecutive cell indices and consecutive storage node indices. Initially, storage nodes having the same storage capacity are consecutively indexed so that the representative matrices are not ragged due to gaps, referred to herein as non-contiguous storage space, where cells do not exist because of differences in numbers of cells in adjacently indexed storage nodes. Addition of more heterogeneous storage nodes can create such gaps when the cells of those storage nodes are added to the matrices. The gaps are managed in the ragged matrix representations by coalescing the non-contiguous storage space, thereby enabling selected protection group members to be relocated using matrix mathematics such as linear algebra so that new protection groups can be created, and capacity can be scaled.

20 Claims, 9 Drawing Sheets

| node \ cell | 6 | 7 | 8 | 9 | 10 | | 6 | 7 | 8 | 9 | 10 | | 6 | 7 | 8 | 9 | 10 |
|---|---|---|---|---|---|---|---|---|---|---|---|---|---|---|---|---|---|
| 1 | 11 | 12 | 13 | 14 | | | 11 | 12 | 13 | 14 | | | 11 | 12 | 13 | 14 | |
| 2 | 11 | 12 | 13 | 14 | 15 | | 11 | 12 | 13 | 14 | 15 | | 11 | 12 | 13 | 14 | 15 |
| 3 | 11 | 12 | 13 | 15 | 16 | | 11 | 12 | 13 | 15 | 16 | | 11 | 12 | 13 | 15 | 16 |
| 4 | 11 | 12 | 15 | 16 | | | 11 | 12 | 15 | 16 | | | 11 | 12 | 15 | 16 | 17 |
| 5 | 11 | 15 | 16 | 14 | | | 11 | 15 | 16 | | | | 11 | 15 | 16 | 17 | 18 |
| 6 | 15 | 16 | 13 | 14 | | | 15 | 16 | | | | | 15 | 16 | 17 | 18 | |
| 7 | 16 | 12 | 13 | 14 | | | 16 | | | 14 | | | 16 | 17 | 18 | 14 | |
| 9 | | | 13 | 14 | | >> | | | 13 | 14 | | >> | 17 | 18 | 13 | 14 | |
| 10 | | 12 | 13 | 14 | | >> | | 12 | 13 | 14 | | >> | 18 | 12 | 13 | 14 | |

| disk \ cell | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 2 | 3 |   | 5 | 11 | 12 | 13 | 15 | 16 |    |    |    |    |    |
| 2 | 1 | 2 | 3 |   | 5 | 11 | 12 | 13 | 15 | 16 |    |    |    |    |    |
| 3 | 1 | 2 | 3 |   | 5 | 11 | 12 | 13 | 15 | 16 |    |    |    |    |    |
| 4 | 1 | 2 | 3 |   | 5 | 11 | 12 | 13 | 15 | 16 |    |    |    |    |    |
| 5 |   |   |   |   |   |   |   |   |   |   | 21 | 22 | 23 | 25 |    |
| 6 |   |   |   |   |   |   |   |   |   |   | 21 | 22 | 23 | 25 |    |
| 7 |   |   |   |   |   |   |   |   |   |   | 21 | 22 | 23 | 25 |    |
| 8 |   |   |   |   |   |   |   |   |   |   | 21 | 22 | 23 | 25 |    |

Figure 4

| node \ cell | 1 | 2 | 3 | 4 | 5 | 6 | 7 | 8 | 9 | 10 | 11 |
|---|---|---|---|---|---|---|---|---|---|---|---|
| 15 | | 25 | | | | | | | | | |
| 14 | 24 | 24 | 25 | 24 | 24 | 24 | | | | | |
| 13 | 23 | 23 | 23 | 25 | 23 | 23 | | | | | |
| 12 | 22 | 22 | 22 | 22 | 25 | 22 | | | | | |
| 11 | 21 | 21 | 21 | 21 | 21 | 25 | | | | | |
| 10 | | 15 | 16 | | | | | | | | |
| 9 | 14 | 14 | 15 | 16 | 14 | 14 | 14 | | | | |
| 8 | 13 | 13 | 13 | 15 | 16 | 13 | 13 | | | | |
| 7 | 12 | 12 | 12 | 12 | 15 | 16 | 12 | | | | |
| 6 | 11 | 11 | 11 | 11 | 11 | 15 | 16 | | | | |
| 5 | | 5 | 6 | | | | | | | | |
| 4 | 4 | 4 | 5 | 6 | 4 | 4 | 4 | | | | |
| 3 | 3 | 3 | 3 | 5 | 6 | 3 | 3 | | | | |
| 2 | 2 | 2 | 2 | 2 | 5 | 6 | 2 | | | | |
| 1 | 1 | 1 | 1 | 1 | 1 | 5 | 6 | | | | |

| node\cell | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 2 | 3 | 4 |   | 11 | 12 | 13 | 14 | 16 | 21 | 22 | 23 | 24 |   |
| 2 | 1 | 2 | 3 | 4 | 5 | 11 | 12 | 13 | 14 | 15 | 21 | 22 | 23 | 24 | 25 |
| 3 | 1 | 2 | 3 |   | 5 | 11 | 12 | 13 | 15 | 16 | 21 | 22 | 23 | 25 | 26 |
| 4 | 1 | 2 | 3 | 5 | 6 | 11 | 12 | 15 | 16 | 17 | 21 | 22 | 25 | 26 |   |
| 5 | 1 | 2 | 5 | 6 | 7 | 11 | 15 | 16 | 17 | 18 | 21 | 25 | 26 |   |   |
| 6 | 1 | 5 | 6 | 7 | 8 | 15 | 16 | 17 | 18 | 13 | 25 |   |   |   |   |
| 7 | 5 | 6 | 7 | 8 | 23 | 16 | 17 | 18 | 14 | 12 |   |   |   |   |   |
| 8 | 6 | 7 | 8 | 22 |   | 17 | 18 | 13 | 13 | 11 | 26 | 22 | 23 | 24 |   |
| 9 | 7 | 8 | 21 | 4 |   | 18 | 12 | 13 | 14 | 15 |   |   |   |   |   |
| 10 | 8 | 25 | 3 | 4 |   |   |   |   |   |   |   |   |   |   |   |
| 11 | 26 | 2 | 3 | 4 |   |   |   |   |   |   |   |   |   |   |   |

Figure 8

Figure 9 ns
COALESCING STORAGE SPACE OF HETEROGENEOUS NODES FOR FLEXIBLE EXPANSION

TECHNICAL FIELD

The subject matter of this disclosure is generally related to electronic data storage, and more particularly to scaling storage capacity in a heterogeneous, multi-node storage system that implements protection groupings for failure recovery.

BACKGROUND

Known storage architectures include, but are not limited to, storage area networks (SANs) and direct-attached storage (DAS). In a typical DAS system, a server is directly attached to local drives without an interconnecting network. Client computers access data by communicating with the server. Drawbacks of that architecture include storage capacity being limited to the local drives that are directly attached to the server, and the server as a single point of failure that can cause the local drives to become inaccessible. The SAN architecture was developed because of such inherent limitations of the typical DAS system. A SAN includes one or more scalable drive arrays that can be accessed by multiple interconnected compute nodes. Because all of the drives in a SAN can be accessed by more than one of the interconnected compute nodes, data access is not lost when one of the compute nodes fails. However, the DAS architecture remains viable due to relative simplicity and low cost.

SUMMARY

The total storage capacity of a group of heterogenous storage nodes having non-uniform storage capacity can be represented as a set of matrices that are used to distribute protection group members. All storage capacity is configured as same-size cells that can be used to store protection group members or provide spare capacity. The matrices have dimensions corresponding to consecutive cell indices and consecutive storage node indices. Initially, storage nodes having the same storage capacity may be consecutively indexed so that the representative matrices are not ragged due to gaps, referred to herein as non-contiguous storage space, where cells do not exist in the matrices due to differences in numbers of cells in adjacently indexed storage nodes. Addition of more heterogeneous storage nodes can create such gaps when the cells of the added storage nodes are added to the matrices. The gaps are managed by coalescing the non-contiguous storage space as represented by the ragged matrices, thereby enabling selected protection group members to be relocated using matrix mathematics. For example, new protection groups can be created and capacity can be scaled using linear algebra.

In some implementations, an apparatus comprises: storage nodes sorted as a function of relative non-volatile storage capacity and assigned contiguous indices as sorted, the non-volatile storage capacity subdivided into indexed, same-size cells, and storage capacity of all storage nodes collectively represented as matrices of contiguously indexed cells and contiguously ordered storage nodes; and storage node addition logic configured, responsive to creation of at least one gap in one of the matrices resulting from addition of at least one new consecutively indexed storage node having different storage capacity than an adjacently indexed storage node, to: coalesce cells adjacent to the at least one gap; and relocate selected protection group members to cells of the new storage node based on the matrices.

In some implementations, a method is implemented with storage nodes sorted as a function of relative non-volatile storage capacity and assigned contiguous indices as sorted, the non-volatile storage capacity subdivided into indexed, same-size cells, and the storage capacity represented as matrices of contiguously indexed cells and contiguously ordered storage nodes, the method comprising: responsive to creation of at least one gap in one of the matrices from addition of at least one new consecutively indexed storage node having different storage capacity than an adjacently indexed storage node: coalescing cells adjacent to the at least one gap; and relocating selected protection group members to cells of the new storage node based on the matrices.

In some implementations, a non-transitory computer-readable storage medium stores instructions that when executed by a computer cause the computer to perform a method with storage nodes sorted as a function of relative non-volatile storage capacity and assigned contiguous indices as sorted, the non-volatile storage capacity subdivided into indexed, same-size cells, and the storage capacity represented as matrices of contiguously indexed cells and contiguously ordered storage nodes, the method comprising: responsive to creation of at least one gap in one of the matrices from addition of at least one new consecutively indexed storage node having different storage capacity than an adjacently indexed storage node: coalescing cells adjacent to the at least one gap; and relocating selected protection group members to cells of the new storage node based on the matrices.

Other aspects, features, and implementations may become apparent in view of the detailed description and figures. All examples, aspects, implementations, and features mentioned in this disclosure can be combined in any technically possible way.

DETAILED DESCRIPTION

Aspects of the invention will be described in the context of a multi-node converged DAS rack that can recover from storage node failures and be scaled by adding drives of a variety of storage capacities. The rack will be described as a storage system, but multiple racks could be interconnected and converged as a single storage system. Furthermore, the invention is not limited to the DAS architecture, and aspects of the invention may be implemented in any of a variety of storage system architectures.

The terminology used in this disclosure is intended to be interpreted broadly within the limits of subject matter eligibility. The terms "disk" and "drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes a converged DAS rack, but that implementation should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
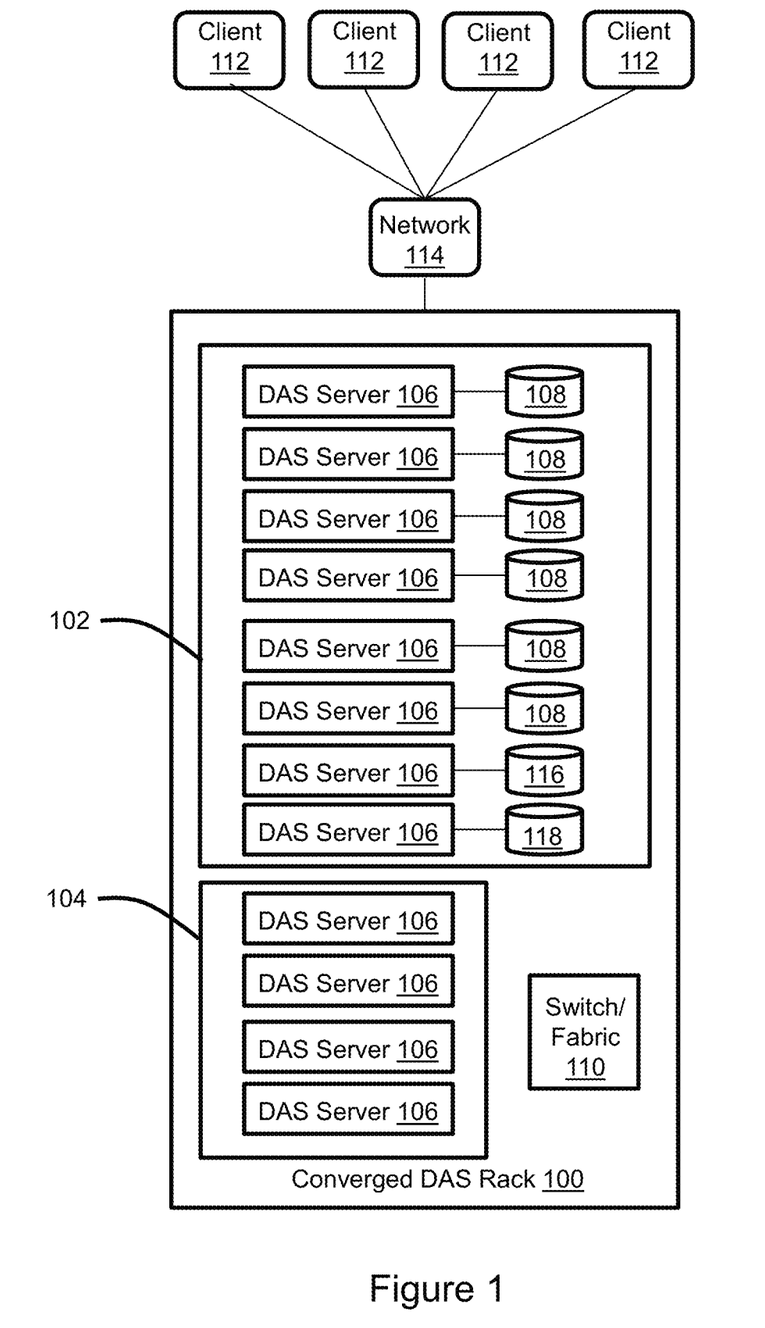
FIG. 1 illustrates a converged, heterogeneous, software-defined DAS storage system that scales by coalescing discontiguous storage space.

FIG. 1 illustrates a converged, heterogeneous, software-defined DAS storage system that scales by coalescing discontiguous storage space. A first group 102 of converged DAS storage nodes provides storage capacity. A second group 104 of converged DAS compute nodes provides compute capacity. Each converged DAS storage node is a DAS server 106 with specialized software components and associated attached non-volatile storage 108, 116, or 118. Each converged DAS compute node is a DAS server 106 with specialized software components. All of the DAS servers 106 are interconnected via a switch/fabric 110. Host applications run on the DAS servers 106 of the second group 104 and use data stored on the non-volatile storage 108, 116, or 118 of the first group 102. The host applications may provide business services to client computers 112 that are in communication with the rack 100 via a network 114. Examples of host applications may include, but are not limited to, software for email, accounting, sales, manufacturing, and inventory control. Although separate groups of converged DAS nodes that respectively provide compute and storage capacity are shown, those functions could be integrated into a single group of dual-function converged DAS nodes.

The DAS servers 106 may be identical, general purpose server computers. As is known in the art, server computers include processors and volatile memory. The processors may include central processing units (CPUs), graphics processing units (GPUs), or both. The volatile memory may include dynamic random-access memory (DRAM) of any kind. The non-volatile storage 108 may include one or more solid-state drives (SSDs), hard disk drives (HDDs), or both.

The DAS storage nodes, which are in the first group 102, are heterogeneous in the sense that they do not all have the same total non-volatile storage capacity, although some of the storage nodes may have the same total non-volatile storage capacity. In the illustrated example, storage 108 represents a first total storage capacity, storage 116 represents a second total storage capacity, and storage 118 represents a third total storage capacity, each of which is different than the others and may include any combination of individual drives of one or more storage capacities. The storage capacities of the drives may be in integer multiple or power of 2 increments relative to a baseline drive size, where "size" is storage capacity. All of the storage 108, 116, 118 is organized into same-size cells. The cells may be partitions or allocations, for example, and without limitation. Multiple drives may be abstracted as a single logical volume.

As will be explained in greater detail below, the same-size cells are used to store members of data protection groups to enable failure recovery. Protection group members are distributed across the storage nodes such that no more than one member of a given protection group is located on any single storage node. A protection group member that becomes inaccessible due to storage node failure is rebuilt using the remaining (accessible) members on the non-failed storage nodes. Distributed spare cells are maintained for rebuilding the inaccessible members. Thus, in response to failure of one of the storage nodes, the protection group members that were stored in cells of that failed storage node are automatically rebuilt in spare cells on the remaining non-failed storage nodes so that all data is accessible.

Figure 2:
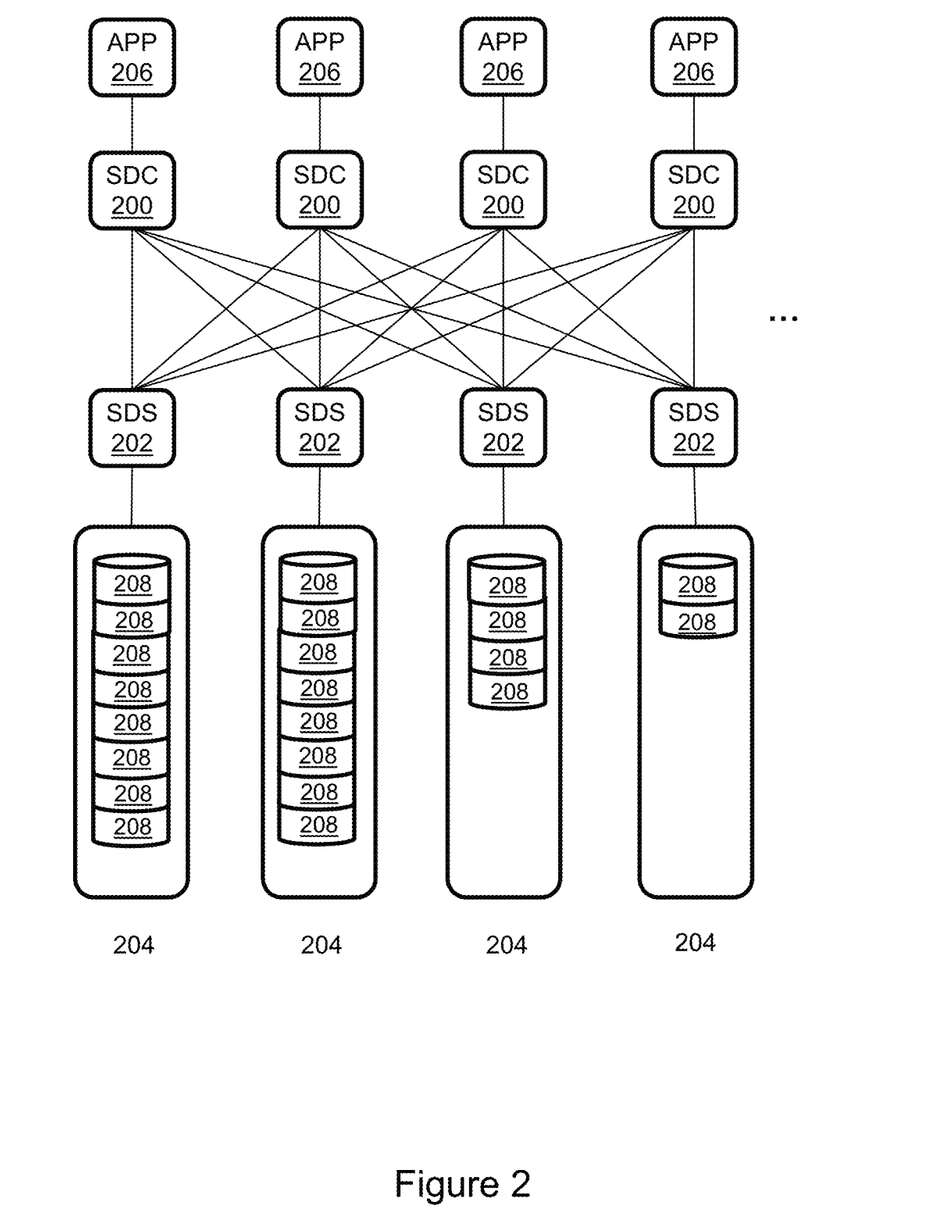
FIG. 2 illustrates software components of the storage system.

FIG. 2 illustrates software components of the storage system. Each of the DAS nodes is converged in the sense that software components enable multiple data access paths so the nodes of the rack function together as a single storage system. Only four of the storage nodes are illustrated for simplicity of illustration. Storage data client (SDC) components 200 running on the DAS servers 106 of the second group 104 (i.e., the compute nodes) provide the underlying operating system (OS) or hypervisor, and thus the host application instances 206, with access to logical blocks of data stored on logical volumes of storage 204. The SDC components send data access commands to the DAS servers of the first group 102 (i.e., the storage nodes) to access the data. Storage data server (SDS) components 202 running on the DAS servers 106 of the first group 102 respond to the commands by accessing physical disks 208 with which the logical volumes of storage 204 are associated. The total storage capacity of all logical volumes maintained by a storage node is the total storage capacity of the storage node. The SDS components also provide storage-related services such as creating and maintaining data protection groups and spares and responding to storage node failures. Resiliency is based on redundant array of independent disks (RAID) or erasure coding (EC) protection groups with member cells distributed across multiple storage nodes. Further resiliency is provided by reserving distributed spare capacity to rebuild protection groups after a storage node failure. The cells can be 100% utilized for RAID or EC protection groups and spare capacity, with deterministic algorithm-based allocation as will be described below.

Figure 3:
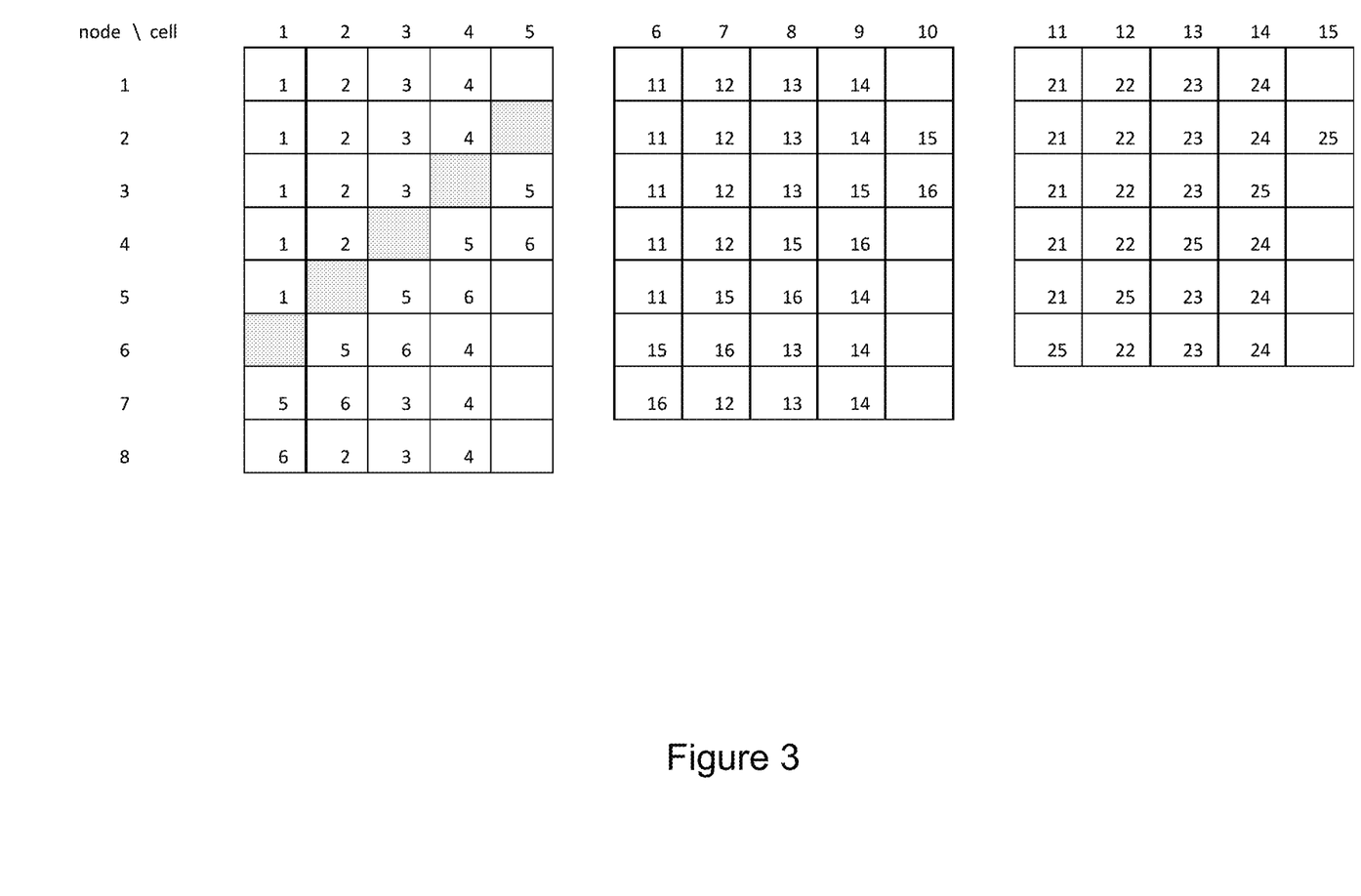
FIG. 3 illustrates an initial configuration of the storage space of the storage nodes.

FIG. 3 illustrates an initial configuration of the storage space of the storage nodes described above. The storage nodes are sorted by the number of cells they contain, in descending order, and assigned contiguous node identifiers, e.g., numbers, that function as indices. The cells are consecutively indexed and organized into cell groups that are represented by matrices, where each row represents an individual indexed storage node, and each column represents a cell index. In the illustrated example, there are six large capacity storage nodes represented by rows 1-6, one medium capacity storage node represented by row 7, and one small capacity storage node represented by row 8.

Each matrix contains only same-size rows and columns. The cell groups that correspond to the matrices are sized based on node storage capacity, node ordering, and protection group size G. Every protection group has a total of G data and parity members, thereby defining the protection group size G. The storage capacity of each storage node is divided into integer multiples of G cells. Each of the matrices has G columns/cell indices. In the illustrated example, G=5 for RAID-5 (4+1) and the storage capacity is divided into integer multiples of 5 cells so the storage space of the small, medium, and large capacity storage nodes is 5, 10, and 15 cells, respectively. The cells are grouped based on node storage capacity, which corresponds to the consecutively indexed sorted node order, to form the matrices. In the illustrated example, the first matrix includes the first set of G cells of all storage nodes because all storage nodes have at least G cells. The second matrix includes the second set of G cells of all medium and large storage nodes because the small storage node does not contain more than G cells. The third matrix includes the third set of G cells of all large storage nodes because the small and medium storage nodes do not contain more than 2*G cells. There are at least G+1 large storage nodes in the initial configuration, where the size of the large storage node is defined by the largest integer multiple of G cells of any node in the storage system.

Reference numbers within matrix cells represent protection group members, e.g., all is are members of protection group 1. All protection groups are distributed vertically or diagonally, and the last column is reserved for spares. The first matrix may have additional spares, which are diagonally distributed, e.g., one diagonal of spares per G rows, starting at rows 2 to G+1. In the illustrated example, protection groups 1-4, 11-14, and 21-24 are vertically distributed in single cell indices, though the group members are not necessarily on contiguously numbered storage nodes. Protection groups 5-6, 15-16, and 25 are diagonally distributed. There are G spare cells distributed vertically in the last column of each of the three matrices, guaranteeing a combined spare capacity equivalent to the storage capacity of one large storage node. Additional spare cells (shown in gray) are allocated diagonally within the first matrix, with one diagonal per G rows.

Figure 4:
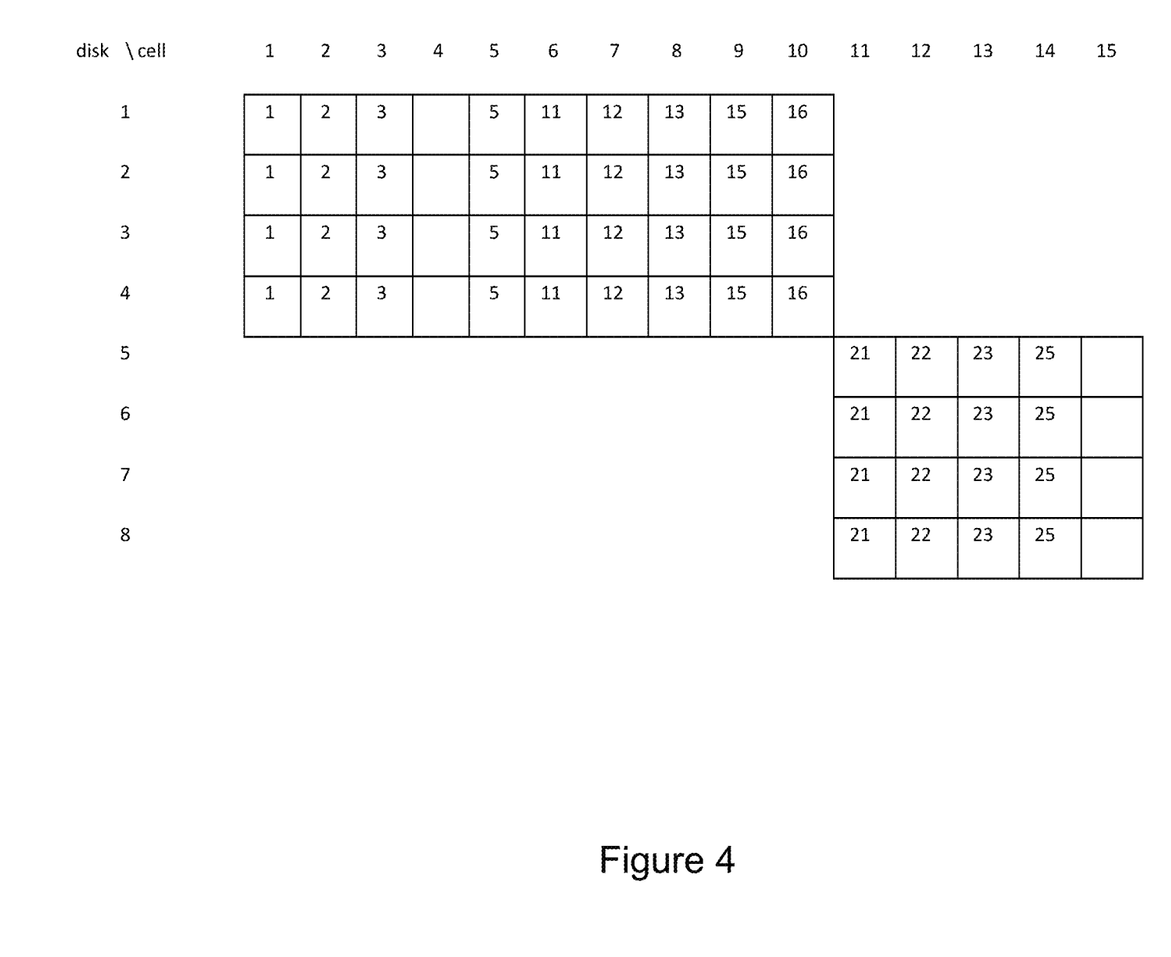
FIG. 4 illustrates the storage space of node 3 in greater detail.

FIG. 4 illustrates the storage space of exemplary node 3 in greater detail. The storage capacity of node 3 is represented by matrices in which rows represent individual disks and columns represent cell indices. The same-size cells are distributed on multiple disks of the storage node. The storage capacities of the disks are integer multiples of a baseline disk storage capacity. As shown in the illustrated example, disks 1-4 are twice as large as disks 5-8. Consequently, disks 1-4 have twice as many cells as disks 5-8.

Figure 5:
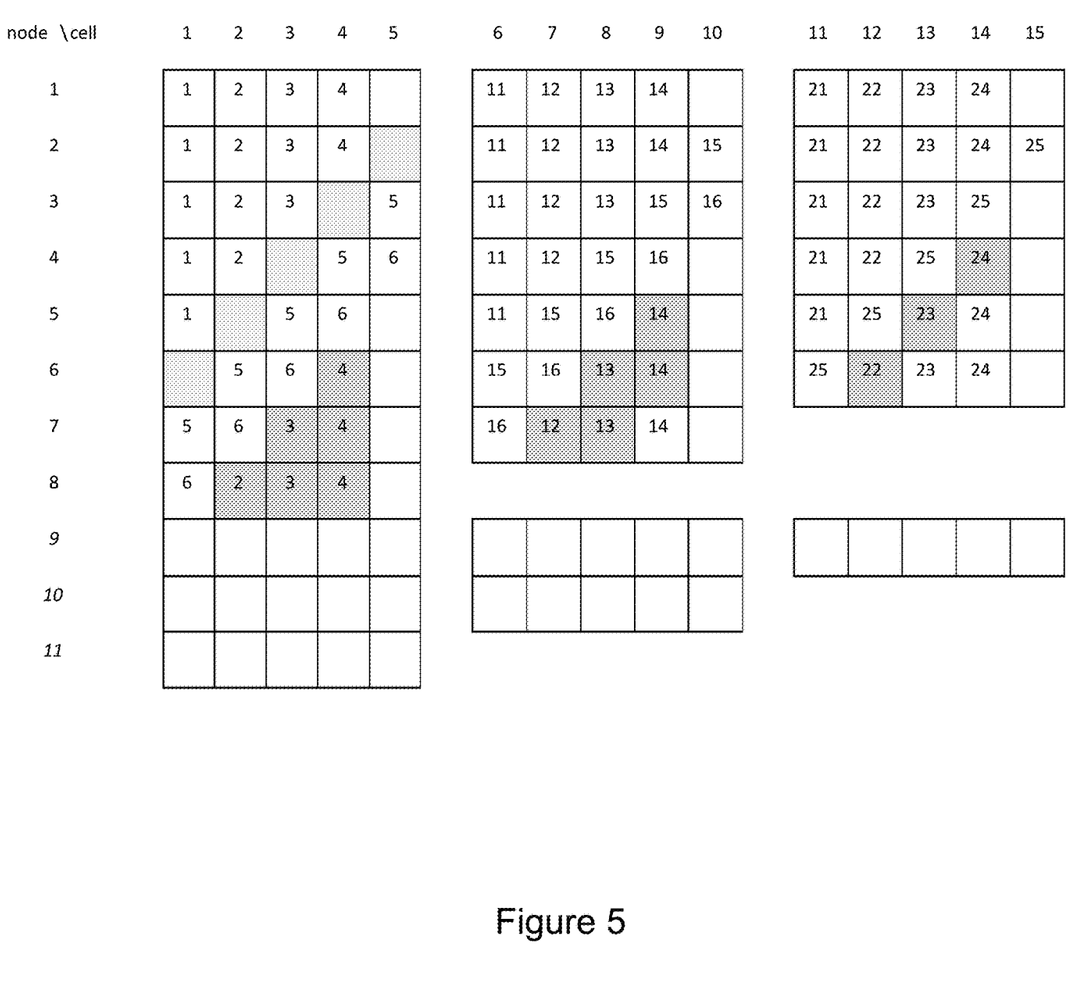
FIGS. 5 through 7 illustrate addition of new storage nodes, coalescing discontiguous storage space, and relocation of protection group members.
Figure 6:
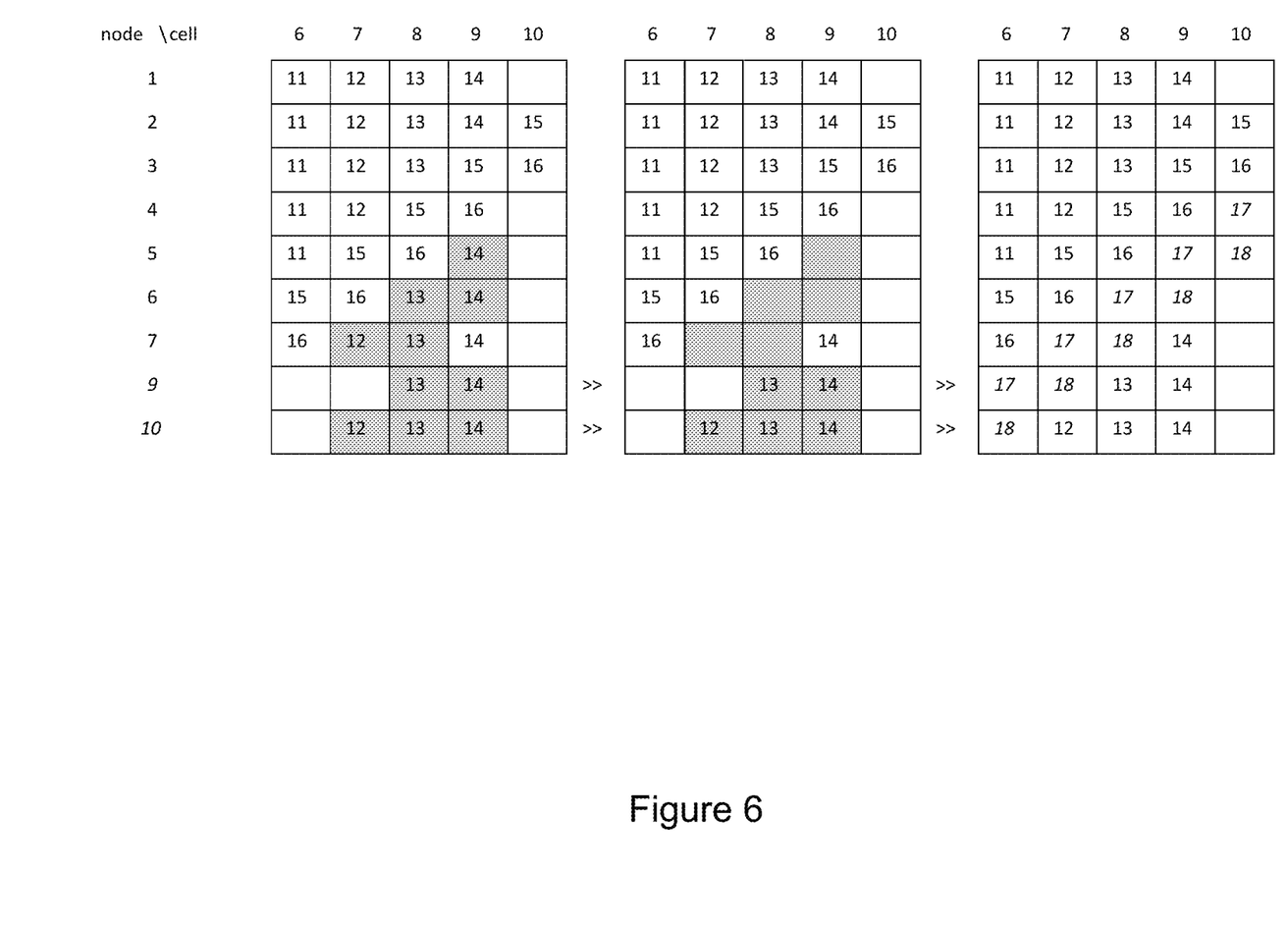
Figure 7:
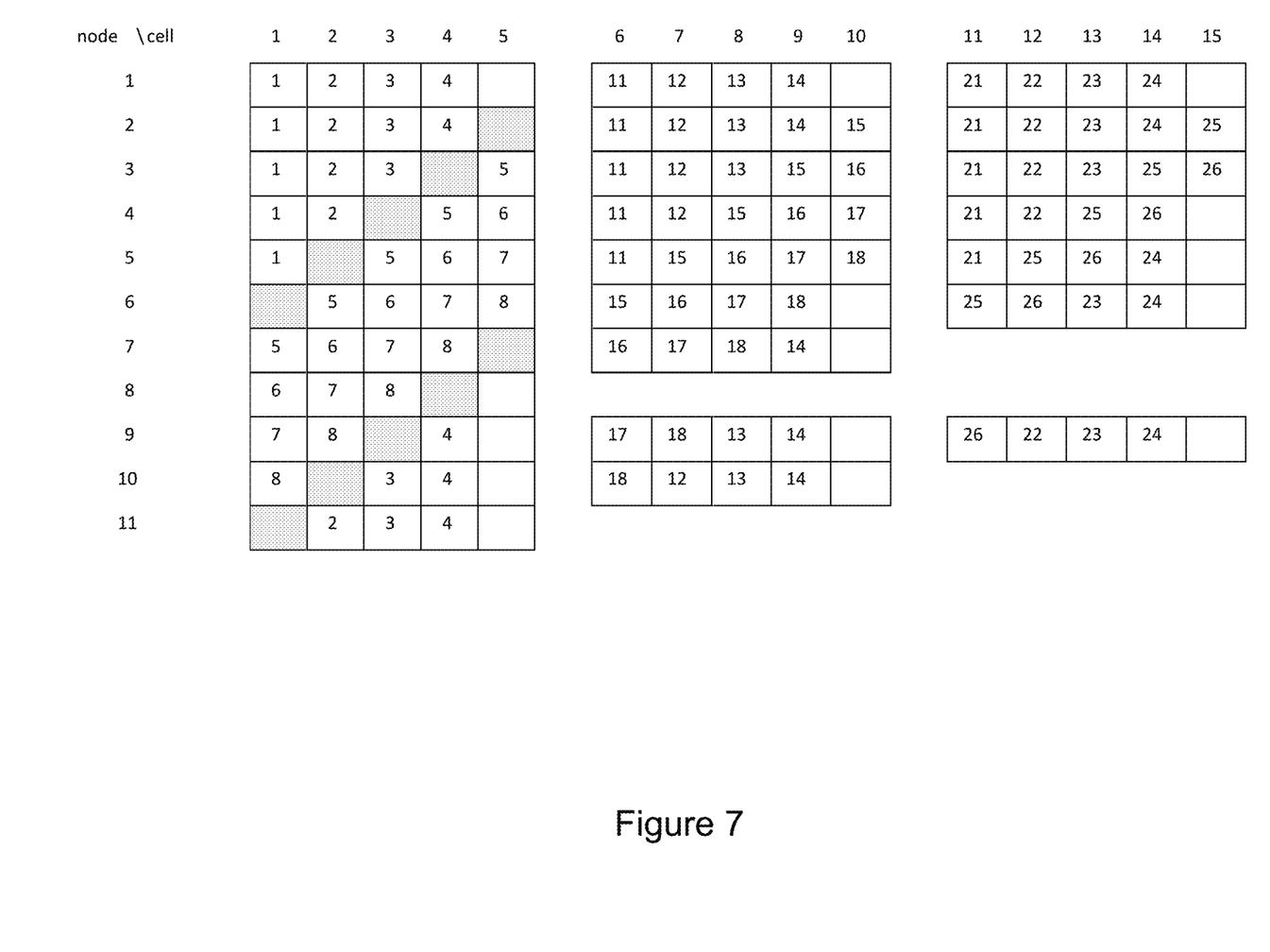

FIGS. 5 through 7 illustrate addition of new storage nodes, coalescing of non-contiguous storage space, and relocation of protection group members. An advantageous feature of some implementations is flexible storage capacity expansion by adding any number of heterogeneous nodes in any order, which is enabled by coalescing non-contiguous storage space. The new storage nodes are added and assigned node numbers that are contiguous with the existing node numbers. As shown in FIG. 5, new nodes 9, 10, and 11 are represented as rows of G-size groups of cells corresponding to node storage capacity. The first matrix in the illustrated example contains the first G cells of all storage nodes, so the matrix representation of the storage space is still contiguous after addition of the new storage nodes. However, the subsequent matrix representations become ragged because they do not have entirely contiguous storage space due to heterogeneity of storage capacity of adjacently indexed storage nodes. The non-contiguous storage space is represented as gaps between rows in the ragged matrices. For example, there is discontinuity between medium capacity nodes 7 and 9 because node 8 is a small capacity node. Representative gaps resulting from the addition of new storage nodes 9, 10, and 11 is managed by coalescing adjacent storage space as shown in FIG. 6 by merging the rows, thereby conceptually eliminating the discontinuity represented by gaps of the missing rows. Selected protection group members are then relocated, e.g., as shown in FIGS. 5 and 6. The following coalescing and relocation algorithm, implemented by storage node addition logic of the storage nodes, adds K new rows to a matrix of M rows in the presence of storage space discontinuity. Non-contiguous (if any) rows are coalesced into a new matrix of M+K rows.

1. N=Minimum (G−2, K)// whichever is smaller
   // relocating group members from diagonal cells to new rows
   for (i=0; i<N; i++)
      for (j=i+2, p=0; j<G; j++, p++)
      {new_row [K−i]. cell [j]=row [M−p]. cell [j]}
2. Create new protection groups using the free cells distributed diagonally in the new matrix.
3. Reserve unused cells in the last column as spares.

Using the algorithm described above, each of the highlighted members in the three original matrices in FIG. 5 is relocated. FIG. 6 shows the new locations of the selected members of the second matrix as a result of the relocations. In the second matrix of cells 6-10, selected (highlighted) members of original groups 12, 13, and 14 are relocated and new protection groups 17 and 18 are created using the free cells distributed diagonally in the new matrix. The new protection groups are created using diagonally-oriented cells that become free after relocating members of the original vertically distributed groups. Unused cells in the last column (cell index 10) are reserved as spares. Two spare cells will "relocate" to the new rows, but no data movement overhead is incurred. When adding multiple rows contemporaneously, there will be G−2 members moved to the last new row, G−3 members to the next new row, etc. Adding G−2 rows will incur the maximum data movement overhead of (G−2)(G−1)/2 members per matrix (Gauss' formula). Adding more than G−2 rows to a matrix will not incur further data movement overhead, which is advantageous because data movement overhead requires processor cycles and storage accesses that can otherwise be used to service IOs from clients. It should be noted that the algorithm may also be used to generate the initial configuration.

FIG. 7 illustrates the result of application of the coalescing and relocation algorithm to all three matrices. After relocating selected members from protection groups 2, 3, and 4 in the first matrix, 12, 13, and 14 in the second matrix, and 22, 23, and 24 in the third matrix, new protection groups 7, 8, 17, 18 and 26 are created using the diagonally distributed free cells. More spare cells (highlighted) are also added diagonally in the first matrix. As the storage system capacity expands, the spare cells in the first matrix will be widely distributed for a faster, parallelized rebuild when a storage node fails.

Figure 8:
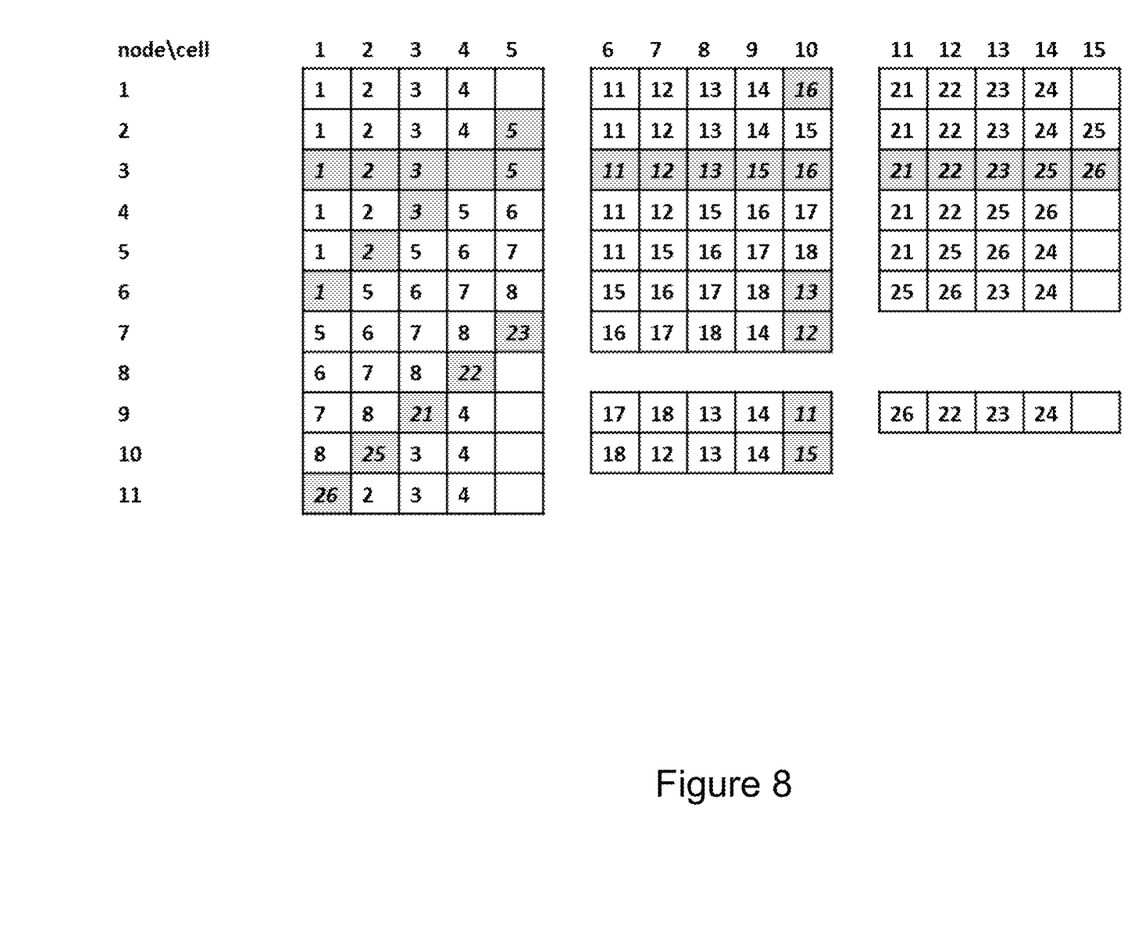
FIG. 8 illustrates how the spare cells are assigned to failed members.

FIG. 8 illustrates allocation, distribution, and use of spare cells. The spare capacity is allocated and distributed in groups of spare cells. Since there are G spare cells distributed vertically in the last column of each matrix, the combined spare capacity of one large storage node is provided. As the storage system capacity expands, additional spare capacity may be allocated and distributed diagonally within the first matrix, so that a target number of node failures can be sustained without loss of recovery capability before the spare capacity is replenished by repairing or replacing the failed storage nodes. For example, assuming a large storage node, e.g., node 3, fails then protection group members on the failed storage node will be rebuilt at spare cells on other nodes. The figure shows an assignment of spares to protection group members. The EC/RAID rebuild load is distributed over all other storage nodes that have not failed. Because there are 14 protection group members to be rebuilt over 10 storage nodes, the load is not perfectly balanced.

When the failed storage node is repaired or replaced, every rebuilt protection group member is relocated back to its original location. Before repairing or replacing the failed storage node there will still be enough spare cells to recover from another contemporaneous failure of a medium or small storage node. Assuming each of the largest storage nodes has storage space subdivided into M*G cells, where M is an integer and G is the protection group size, whenever the storage system grows to M*G+1 nodes (any size), the first matrix will have enough spare cells for fully parallelized and balanced EC/RAID rebuild to recover from the failure of any storage node.

Figure 9:
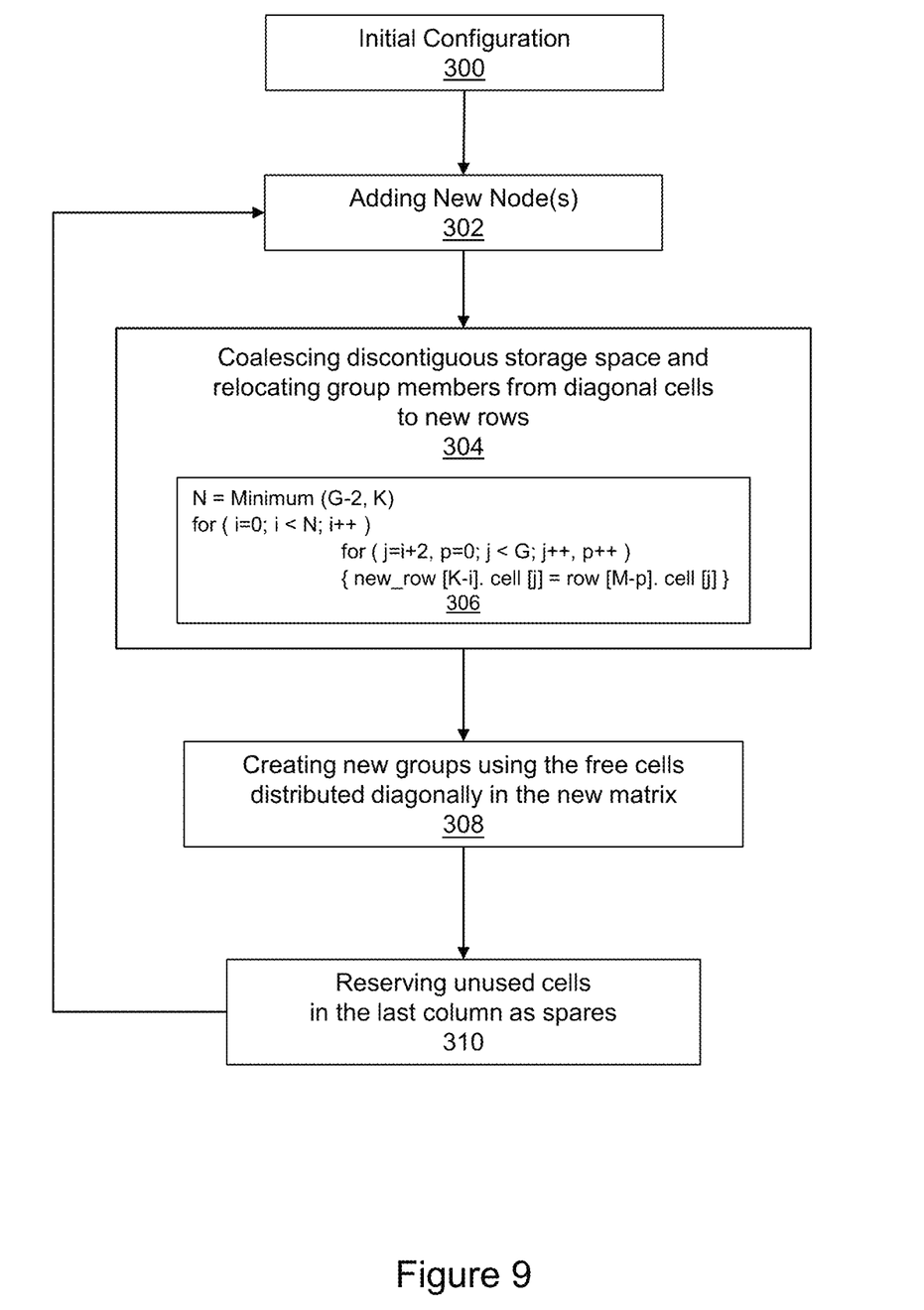
FIG. 9 illustrates a method for coalescing storage space of heterogeneous nodes for flexible expansion.

FIG. 9 illustrates a method for coalescing storage space of heterogeneous nodes for flexible expansion. Step 300 is implementing an initial configuration with an original set of storage nodes. The storage space of all storage nodes is configured as same-size cells and the storage nodes, in descending order by storage capacity, are assigned contiguous, incremental node numbers. The storage space is configured into cell groups of integer multiples of G, such that the total storage space can be represented as matrices of cells and large storage nodes are represented by the largest integer multiple of G. There are at least G+1 large storage nodes in the initial configuration. Protection groups are created, and protection group members are distributed such that no more than one member per group is located on any single storage node. Step 302 is adding one or more new storage nodes. The new storage nodes are assigned node numbers that are contiguous with the existing node numbers. Step 304 is coalescing non-contiguous storage space and relocating selected protection group members from diagonally oriented cells to new rows. As indicated in step 306, K new rows can be added to a matrix of M rows while coalescing any non-contiguous rows into a new matrix of M+K rows using the algorithm already described above. Step 308 is creating new protection groups that are located in diagonally distributed free cells resulting from the relocations of step 304. Step 310 is reserving unused cells in the last column of each matrix/cell group as spares. Steps 302 through 310 can be iterated each time new storage nodes are added.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
storage nodes sorted as a function of non-volatile storage capacity and the storage nodes assigned contiguous indices as sorted, the non-volatile storage capacity subdivided into indexed same-size cells, and storage capacity of all storage nodes collectively represented as matrices of i) contiguously indexed cells and ii) the storage nodes contiguously ordered; and
storage node addition logic configured, responsive to creation of at least one gap in one of the matrices resulting from addition of at least one new consecutively indexed storage node having different storage capacity than an adjacently indexed storage node, to:
coalesce cells adjacent to the at least one gap; and
relocate selected protection group members, in the cells adjacent to the at least one gap, to cells of the at least one new consecutively indexed storage node based on the matrices.

2. The apparatus of claim 1 wherein the storage node addition logic is configured to add K new rows of storage nodes to a matrix of M rows to create a new matrix of M+K rows as follows:
N=Minimum (G−2, K)
for (i=0; i<N; i++)
for (j=i+2, p=0; j<G; j++, p++)
{new_row [K−i]. cell [j]=row [M−p]. cell [j]}.

3. The apparatus of claim 1 wherein the storage node addition logic is configured to create new protection groups using free cells distributed diagonally in a new matrix.

4. The apparatus of claim 3 wherein the storage node addition logic is configured to reserve unused cells in last columns of the matrices as spares.

5. The apparatus of claim 4 wherein the spares are configured to be utilized for rebuilt protection group members of a failed one of the storage nodes.

6. The apparatus of claim 5 wherein the storage nodes are configured to relocate the rebuilt protection group members to a replacement storage node of the failed storage node following repair.

7. The apparatus of claim 1 wherein at least one of the at least one new consecutively storage node has greater storage capacity than at least one of the storage nodes.

8. A method implemented with storage nodes sorted as a function of non-volatile storage capacity and the storage nodes assigned contiguous indices as sorted, the non-volatile storage capacity subdivided into indexed same-size cells, and the storage capacity represented as matrices of P contiguously indexed cells and ii) the storage nodes contiguously ordered, the method comprising:
responsive to creation of at least one gap in one of the matrices from addition of at least one new consecutively indexed storage node having different storage capacity than an adjacently indexed storage node:
coalescing cells adjacent to the at least one gap; and relocating selected protection group members, in the cells adjacent to the at least one gap, to cells of the at least one new consecutively index storage node based on the matrices.

9. The method of claim 8 wherein coalescing and relocating comprises adding K new rows of storage nodes to a matrix of M rows to create a new matrix of M+K rows as follows:
N=Minimum (G−2, K)
for (i=0; i<N; i++)
for (j=i+2, p=0; j<G; j++, p++)
{new_row [K−i]. cell [j]=row [M−p]. cell [j]}.

10. The method of claim 8 comprising creating new protection groups using free cells distributed diagonally in a new matrix.

11. The method of claim 10 comprising reserving unused cells in last columns of the matrices as spares.

12. The method of claim 11 comprising using the spares to rebuild protection group members of a failed one of the storage nodes.

13. The method of claim 12 comprising relocating the rebuilt protection group members to a replacement storage node of the failed storage node following repair.

14. The method of claim 9 wherein at least one of the at least one new consecutively indexed storage node has greater storage capacity than at least one of the storage nodes, and comprising coalescing storage space of the at least one of the at least one new consecutively indexed storage node with other storage nodes of same or greater storage capacity.

15. A non-transitory computer-readable storage medium storing instructions that when executed by a computer cause the computer to perform a method with storage nodes sorted as a function of non-volatile storage capacity and the storage nodes assigned contiguous indices as sorted, the non-volatile storage capacity subdivided into indexed same-size cells, and the storage capacity represented as matrices of i) contiguously indexed cells and ii) the storage node contiguously ordered, the method comprising:
responsive to creation of at least one gap in one of the matrices from addition of at least one new consecutively indexed storage node having different storage capacity than an adjacently indexed storage node:
coalescing cells adjacent to the at least one gap; and
relocating selected protection group members, in the cells adjacent to the at least one gap, to cells of the at least one new consecutively indexed storage node based on the matrices.

16. The non-transitory computer-readable storage medium of claim 15 wherein coalescing and relocating comprises adding K new rows of storage nodes to a matrix of M rows to create a new matrix of M+K rows as follows:
N=Minimum (G−2, K)
for (i=0; i<N; i++)
for (j=i+2, p=0; j<G; j++, p++)
{new_row [K−i]. cell [j]=row [M−p]. cell [j]}.

17. The non-transitory computer-readable storage medium of claim 15 wherein the method comprises creating new protection groups using free cells distributed diagonally in a new matrix.

18. The non-transitory computer-readable storage medium of claim 17 wherein the method comprises reserving unused cells in last columns of the matrices as spares.

19. The non-transitory computer-readable storage medium of claim 18 wherein the method comprises using the spares to rebuild protection group members of a failed one of the storage nodes.

20. The non-transitory computer-readable storage medium of claim 13 wherein the method comprises relocating the rebuilt protection group members to a replacement storage node of the failed storage node following repair.

* * * * *